United States Patent
Lazaratos et al.

(10) Patent No.: US 6,502,038 B1
(45) Date of Patent: Dec. 31, 2002

(54) METHOD FOR NON-HYPERBOLIC MOVEOUT ANALYSIS OF SEISMIC DATA

(75) Inventors: Spyridon K. Lazaratos, Spring, TX (US); Pravin M. Shah, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 347 days.

(21) Appl. No.: 09/609,263

(22) Filed: Jun. 30, 2000

(51) Int. Cl.⁷ .............................................. G06F 19/00
(52) U.S. Cl. ........................................... 702/14; 175/45
(58) Field of Search .............................. 702/14; 367/31, 367/57, 76; 175/45

(56) References Cited

U.S. PATENT DOCUMENTS

| | | | |
|---|---|---|---|
| 5,128,899 A | 7/1992 | Boyd et al. | 367/50 |
| 6,023,443 A | 2/2000 | Dubinsky et al. | 367/76 |
| 6,026,913 A | 2/2000 | Mandal et al. | 175/45 |

OTHER PUBLICATIONS

Alkhalifah, T., 1997, "Velocity Analysis Using Nonhyperbolic Moveout in Transversely Isotropic Media", Geophysics, vol. 62, No. 6; pp. 1839–1854.

Byun, B.S., 1989, "Anisotropic Velocity Analysis for Lithology Discrimination", Geophysics, vol. 54, No. 12; pp. 1564–1574.

Carlson, David H., 1997, "3D Long Offset Non–Hyperbolic Velocity Analysis", Expanded Abstracts of 67th Ann. Int. SEG Mtg.; pp. 1963–1964.

Castle, R. J., 1994, "A Theory of Normal Moveout", Geophysics, vol. 59, No. 6; pp. 983–999.

Bazelaire, Eric de, 1988, "Normal Moveout Revisited: Inhomogeneous Media and Curved Interfaces", Geophysics, vol. 53, No. 2; pp. 143–157.

Gidlow, P. M., 1990, "Preserving Far Offset Seismic Data Using Nonhyperbolic Moveout Correction", Expanded Abstracts on 60th Ann. Int. SEG Mtg.; pp. 1726–1729.

Hake, H., Helbig, K., and Mesdag, C. S., 1984, "Three–Term Taylor Series For $t^2-x^2$ Curves of P– and S– Waves Over Layered Transversely Isotropic Ground", Geophysical Prospecting, 32; pp. 858–850.

Tsvankin, Ilya and Thomsen, Leon, 1994, "Nonhyperbolic Reflection Moveout in Anisotropic Media", Geophysics, vol. 59, No. 8, pp. 1290–1304.

Yilmaz, O., 1989, "Velocity–Stack Processing", Geophyscial Prospecting, 37; pp. 357–382.

*Primary Examiner*—Edward Lefkowitz
*Assistant Examiner*—Victor J. Taylor
(74) *Attorney, Agent, or Firm*—J. Paul Plummer

(57) ABSTRACT

A method for moveout-correcting CDP gathers of seismic data that takes nonhyperbolic moveout at large offsets into account. The entire range of offsets is divided into smaller ranges. Within each smaller range, a curve is fitted to the reflection time vs. offset data, and these separate curves are made to be continuous at range boundaries. The curves may be the hyperbolic or quartic options available in commercial seismic data processing packages. Additional computation time required due to lack of a single velocity function can be compensated for by interpolation techniques. The method has application to, inter alia, AVO analysis.

20 Claims, 11 Drawing Sheets

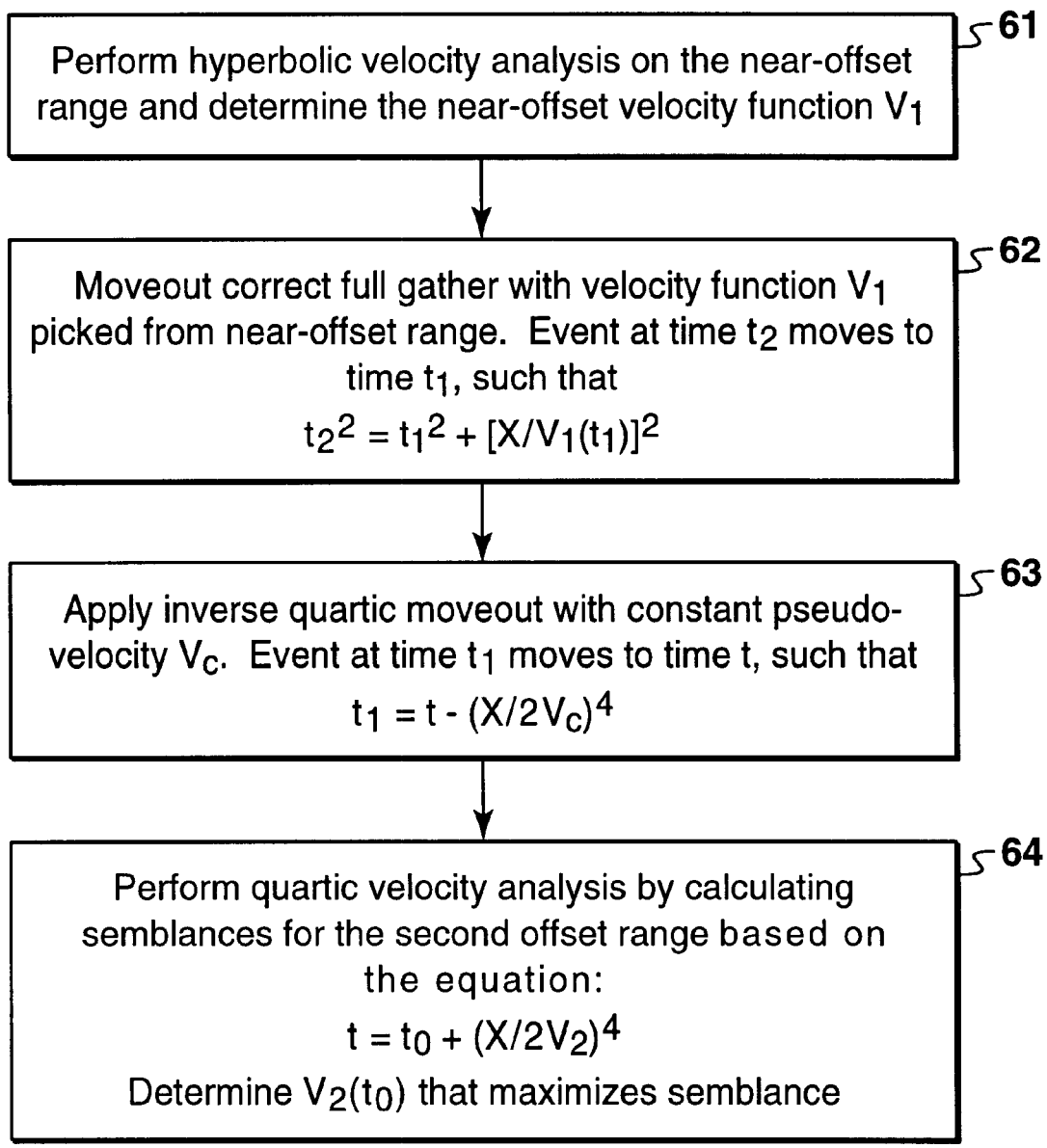

```
┌─────────────────────────────────────────────┐ ┌─61
│ Perform hyperbolic velocity analysis on the │
│ near-offset range and determine the         │
│ near-offset velocity function V₁            │
└─────────────────────────────────────────────┘
                       ↓
┌─────────────────────────────────────────────┐ ┌─62
│ Moveout correct full gather with velocity   │
│ function V₁ picked from near-offset range.  │
│ Event at time t₂ moves to time t₁, such that│
│        t₂² = t₁² + [X/V₁(t₁)]²              │
└─────────────────────────────────────────────┘
                       ↓
┌─────────────────────────────────────────────┐ ┌─63
│ Apply inverse quartic moveout with constant │
│ pseudo-velocity V_c. Event at time t₁ moves │
│ to time t, such that                        │
│            t₁ = t - (X/2V_c)⁴               │
└─────────────────────────────────────────────┘
                       ↓
┌─────────────────────────────────────────────┐ ┌─64
│ Perform quartic velocity analysis by        │
│ calculating semblances for the second       │
│ offset range based on the equation:         │
│              t = t₀ + (X/2V₂)⁴              │
│      Determine V₂(t₀) that maximizes        │
│              semblance                      │
└─────────────────────────────────────────────┘
```

FIG. 6

METHOD FOR NON-HYPERBOLIC MOVEOUT ANALYSIS OF SEISMIC DATA

FIELD OF THE INVENTION

This invention relates to the field of seismic data processing and in particular to a method for moveout-correcting seismic data having non-hyperbolic moveout at longer offsets. Uses of the invention include, without limitation, pre-stack data analysis for AVO applications.

BACKGROUND OF THE INVENTION

AVO is an abbreviation for Amplitude versus Offset, or, as it is sometimes written, amplitude variation with offset. AVO is a seismic data analysis method based on studying the variation in the amplitude of reflected waves with changes in the distance (offset) between the seismic source and receiver. The AVO response of the reflection events associated with the boundaries between the reservoir rock and the surrounding sealing materials often depends on the properties of the fluid stored in the reservoir pore space. Because of this property, AVO analysis is often used as a tool for reservoir fluid prediction.

AVO analysis is performed on Common-Depth-Point (CDP) gathers. Seismic events observed in CDP gathers exhibit a curvilinear shape (moveout). In order for the AVO method to be practically applicable to large data volumes, the gather has to be transformed (moved-out), so that the reflection events become horizontal (flat). In standard practice, this is performed using the Normal Moveout (NMO) method, which assumes that the original moveout of the reflection events is hyperbolic. This assumption works well for a small range of recorded offsets (usually up to about 3km). But for longer-offset gathers that are now commercially feasible to acquire and necessary for effective AVO analysis and reservoir properties prediction, the assumption is not adequate; events exhibit non-hyperbolic moveout over the longer offset ranges. An example is provided in FIGS. 1A and 1B. The picked reflection event 10 in FIG. 1A is flattened only over a limited range of offsets after NMO in FIG. 1B. In analyzing the AVO behavior of such data, the valuable far offsets have to be discarded; if they are included without proper flattening, there is a risk of wrong fluid type prediction. There is, therefore, a need for an efficient method that takes into account the non-hyperbolic moveout of the reflection events and flattens them over the complete range of offsets.

Non-hyperbolic reflection moveout has been recognized as a significant problem for a long time, and a large body of geophysical literature has been devoted to it. Current solutions fall into the following categories.
Different Approximations Used for the Moveout of Reflection Events Normal-moveout is based on the hyperbolic approximation $$t^2 = t_0^2 + \left(\frac{X}{V}\right)^2$$

where t is the reflection time at an offset X, $t_0$ the zero-offset time for the same reflection and V the Normal-Moveout (NMO) velocity. (Notwithstanding the preceding common terminology, it should be understood that V and $t_0$ are not necessarily physically meaningful, but rather merely parameters that characterize the observations.) This approach is implemented in standard velocity-analysis packages where measures of reflection signal coherency (semblance) are calculated along hyperbolic trajectories through the seismic data. Trajectories corresponding to maximum coherency (semblance peaks) correspond to seismic events. Identifying the semblance peaks on 2-dimensional velocity analysis displays allows determination of the Normal-Moveout velocity V. If the parameter $t_0$ is changed, then a different value of V will correspond to the semblance peaks. Thus V can be considered to be a function of $t_0$, or $V(t_0)$.

A commonly adopted method for extending the validity of this equation to longer offsets is the use of the truncated 4-th order Taylor series expansion. (See, for example, Gidlow, P. M., and Fatti, J. L., 1990, "Preserving far offset seismic data using non-hyperbolic moveout correction", Expanded Abstracts of 60th Ann. Int. SEG Mtg., 1726–1729.) This approach is commercially available in the data processing systems of most seismic contractors. The equation used is:

$$t^2 = t_0^2 + \left(\frac{X}{V}\right)^2 - \left(\frac{X}{W}\right)^4$$

For each zero-offset time to, two parameters, V and W, need to be defined. Extending the standard semblance-based velocity analysis method to this case would imply picking peaks in 3-dimensional semblance panels (one for each CDP location, the three axes being time, V and W). This would be cumbersome and require special graphics. For this reason the most common approach is to first get an estimate of V, using the near offset data, then fix V and estimate W and then repeat the process until satisfactory alignment of the events has been achieved. The disadvantage of such an approach is that its application is time-consuming, because several iteration steps may be required for converging to a good set of coefficients for 2-nd and 4-th order terms.

Tsvankin and Thomsen derived an expression which they claimed to be an improvement upon the Taylor expansion formula in the presence of velocity anisotropy (wave velocity different for different propagation directions). (Tsvankin, I., and Thomsen, L., 1994, "Nonhyperbolic reflection moveout in anisotropic media", Geophysics, 59, 1290–1304.) This expression was re-written by Alkhalifah. (Alkhalifah, T., 1997, "Velocity analysis using nonhyperbolic moveout in transversely isotropic media", Geophysics, 62, 1839–1854.) Their expression is:

$$t^2 = t_0^2 + \frac{X^2}{V^2} - \frac{2\eta X^4}{V^2[t_0^2 V^2 + (1+2\eta)X^2]}$$

where η is an effective anisotropy parameter and V is the NMO velocity.

In addition to the above formulas, other types of equations have been proposed. Byun et al. introduced a "skewed" hyperbolic moveout formula. (Byun, B. S., Corrigan, D., and Gaiser, J. E., 1989, "Anisotropic velocity analysis for lithology discrimination", Geophysics, 54, 1564–1574.) Castle and de Bazelaire proposed the use of a shifted-hyperbola equation. (Castle, R. J., 1994, "A theory of normal moveout", Geophysics, 59, 983–999; de Bazelaire, E., 1988, "Normal moveout revisited: Inhomogeneous media and curved interfaces", Geophysics, 53, 143–157.) Yilmaz proposes the use of parabolas to describe the residual moveout of reflections after NMO has been applied. (Yilmaz, O., 1989, "Velocity-stack processing", Geophysical Prospecting, 37, 351–382.)

All of the above methods suffer from the following shortcomings:

Non-hyperbolic moveout can be caused by vertical velocity heterogeneity, curvature of the reflecting horizon, lateral velocity variation and velocity anisotropy. Given this number of factors and the geologic complexity of the subsurface, it is unlikely that a single mathematical expression can provide a universal description applicable to all situations. Locations where reflection events exhibit anomalous moveout are often the places where hydrocarbon traps exist (vicinity of faults, salt domes). Failure of moveout algorithms to work adequately under such situations is a significant defect.

Even in cases when such algorithms can work, their application can be cumbersome and time-consuming, because several iteration steps may be required for determining the parameters included in the expressions (see the comments on the truncated Taylor series approach above).

Depth Migration with Detailed Subsurface Velocity Models

Since non-hyperbolic moveout is caused by geologic complexity and heterogeneity, an imaging method that can handle those complications accurately should be able to produce CDP gathers with flattened reflection events. Depth migration is the most accurate imaging method available today, and algorithms are available that can deal with velocity anisotropy and heterogeneity. Yet, depth migration is extremely sensitive to the accuracy of the velocity model used for imaging and very expensive to do in a manner that preserves AVO information. Numerous publications exist on methods for determining velocity models for depth migration. The basic scheme in such methods is to depth migrate with an initial velocity model, inspect the results, modify the velocity model and migrate again, performing a number of iterations until reflection events in CDP gathers are flat. This process is extremely time consuming and usually requires geologic input for constructing adequate velocity models.

Near-surface Correction Models

In situations where non-hyperbolic moveout is caused by topographic relief or near-surface heterogeneity (for example presence of shallow gas, permafrost), methods are available to address the problem. Of course, such methods will be effective only if near-surface heterogeneity is the only cause of non-hyperbolic moveout and if the near-surface properties are known with a high degree of accuracy.

Automatic Event Detection Methods

Such methods do not assume any model for the moveout of reflection events. Rather, they use pattern recognition techniques to track the events in the data. Once the events are tracked, they can be flattened using time shifting. An example of such a method is the one proposed by Boyd et al. (See U.S. Pat. No. 5,128,899.) The problem with such methods is that they fail to work adequately under the presence of noise, since noise can easily cause erroneous event tracking.

In view of the preceding description of current technology, a need exists for a method that:

Is generally applicable for addressing non-hyperbolic moveout problems, independent of the geologic factor causing non-hyperbolic moveout. The method should work adequately even for areas of large geologic complexity, large source-to-receiver offsets and large amounts of velocity anisotropy.

Is efficient to apply, because it is not based on an iterative procedure.

Is based on familiar velocity analysis tools and displays, readily available in most commercial processing packages.

The present invention satisfies these needs.

SUMMARY OF THE INVENTION

In one embodiment, the invention is a method for moveout-correcting a common-depth-point (CDP) gather of seismic data where the range of offsets is large enough that the moveout is nonhyperbolic for the longer offsets, which method comprises the steps of (a) dividing the offsets into discrete ranges, (b) fitting an analytical function for reflection time as a function of offset within each offset range, (c) combining these functions, enforcing continuity at range boundaries, into a single, piecewise-continuous function, and (d) moveout-correcting the seismic data using the piecewise-continuous function.

Hyperbolic functions are used in some embodiments of the invention; others use quartic polynomials or a combination of hyperbolic and quartic. Higher-degree polynomials or other functions may be used. Preferred embodiments of the invention use hyperbolic or quartic velocity analysis in forms currently available in standard seismic processing packages. The invention includes methods for flattening the reflection events over all offsets with a minimum number of offset ranges, thereby speeding up the process further.

The invention also includes methods for efficiently moving out the seismic data to offset the increase in computation time due to using more than one velocity function for moveout. Curves called pseudo-horizons are generated from the piecewise-continuous velocity function, and moveout is accomplished in some embodiments by interpolating between the pseudo-horizons.

In another embodiment, before horizon-based moveout, the input trace is interpolated to a finer sampling interval using high precision interpolation such as frequency-domain, sinc-function interpolation.

Potential uses of the present invention include AVO (Amplitude vs. Offset) applications.

BRIEF DESCRIPTION OF THE DRAWINGS

The present invention and its advantages will be better understood by referring to the following detailed description and the attached drawings in which:

FIG. 6 is a flow chart showing the standard quartic velocity analysis process;

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents which may be included within the spirit and scope of the invention, as defined by the appended claims.

DETAILED DESCRIPTION OF THE PREFERRED EMBODIMENTS

Figures 1A, 1B:
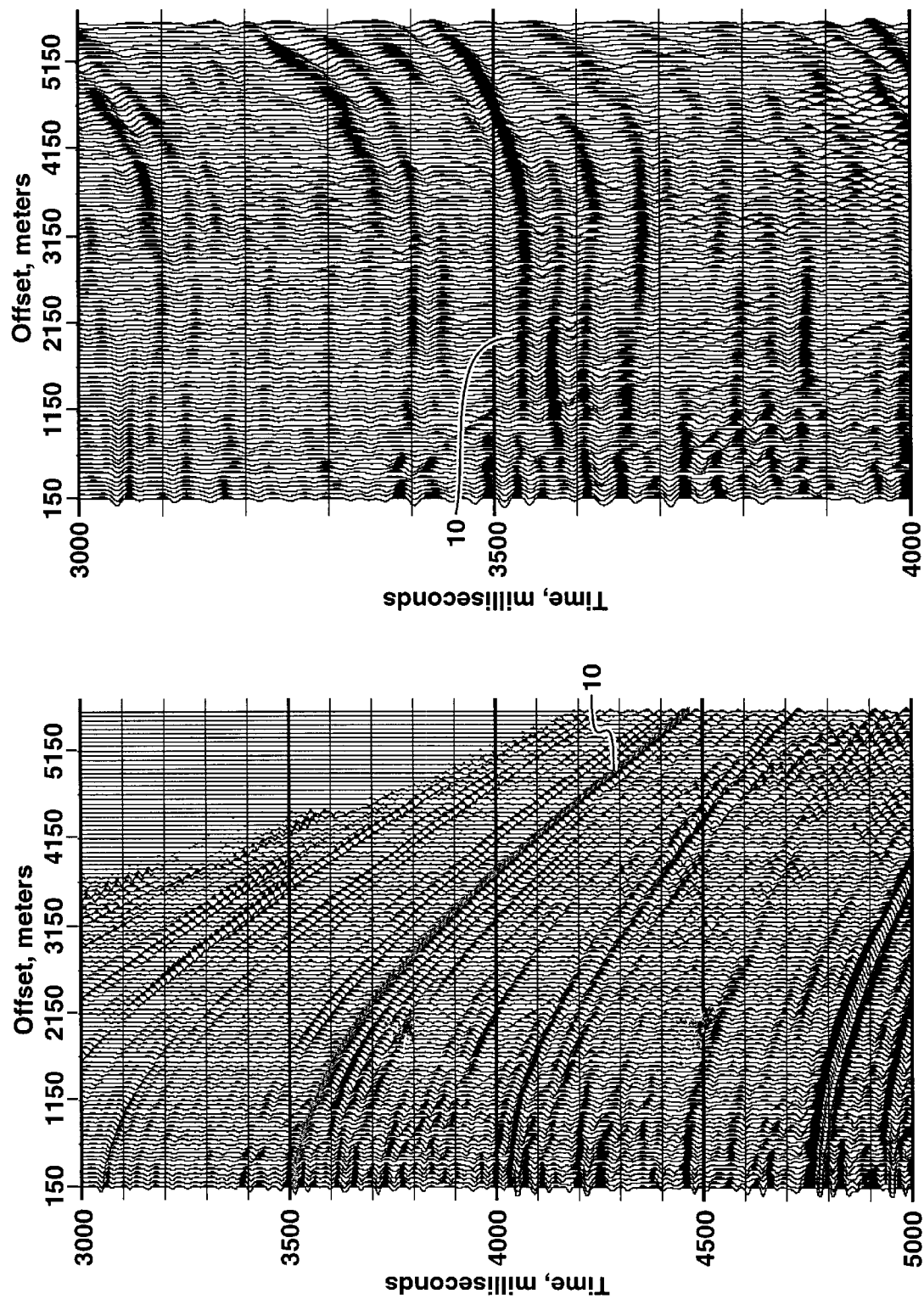
FIGS. 1A and 1B illustrate the problem of nonhyperbolic moveout.
Figure 2A:
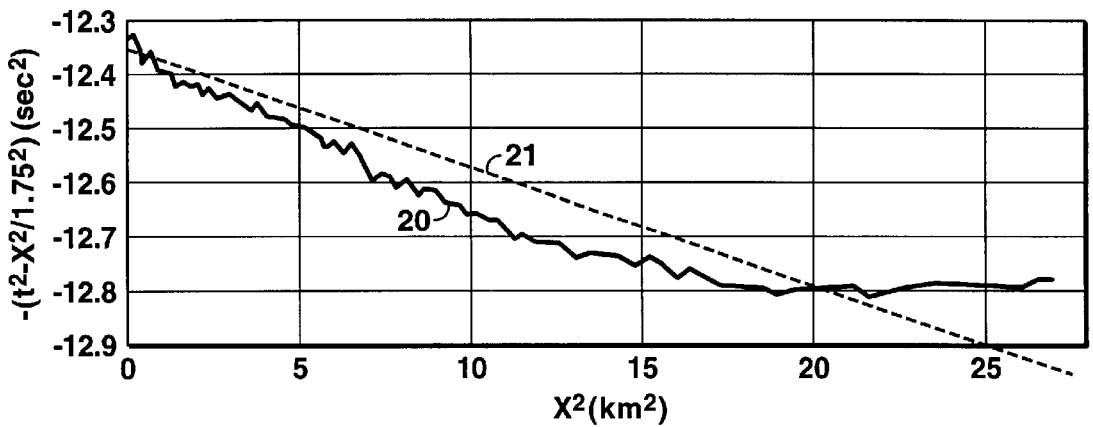
FIGS. 2A, 2B, and 2C illustrate the improvement obtained by piecewise hyperbolic fit (FIG. 2B) and piecewise quartic fit (FIG. 2C) compared to NMO (FIG. 2A)
Figure 2B:
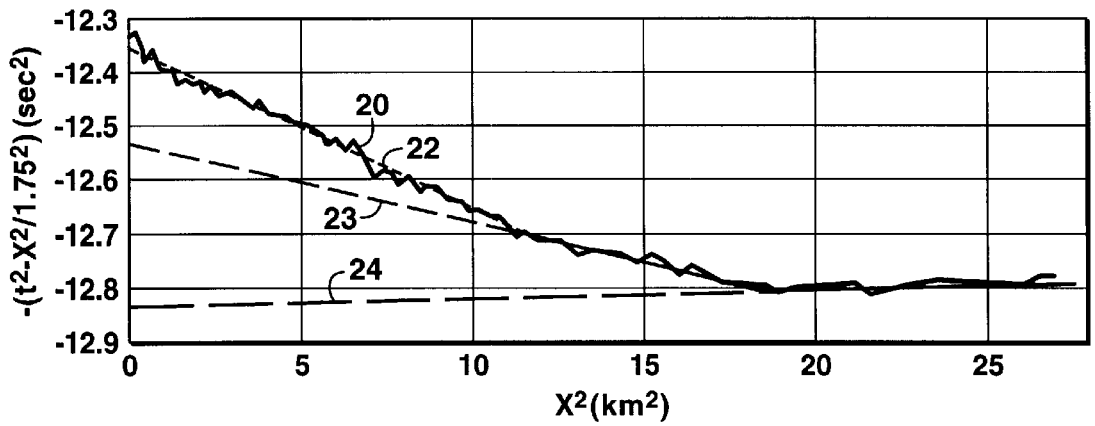
Figure 2C:
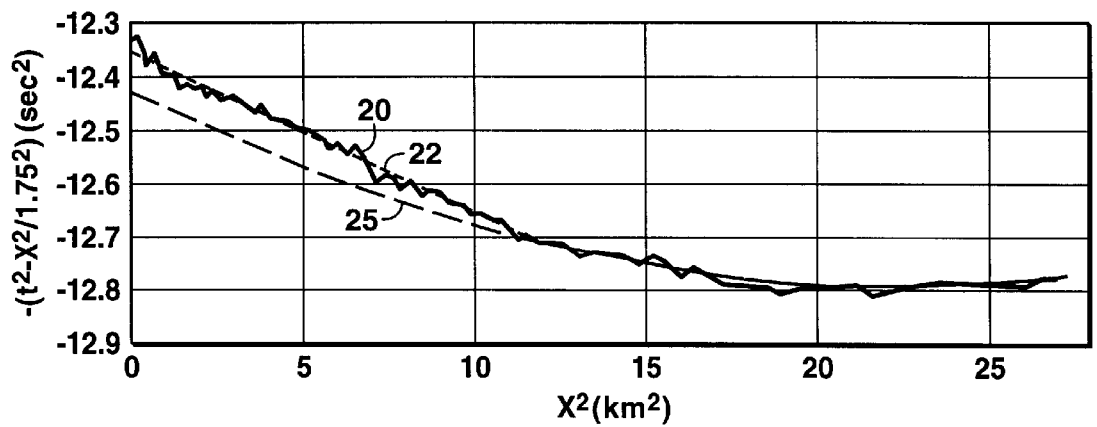

The main concept underlying the present invention is described in FIGS. 2A–2C, which show reflection time graphs in a time-squared vs. offset-squared representation. The vertical axis represents the value of the function–$(t^2-X^2/1.75^2)$, where t is the reflection time in seconds and X the offset in kilometers. The horizontal axis represents the value of $X^2$. This is a rotated version of a standard $t^2$ vs. $X^2$ plot. On such a display hyperbolic events plot as straight lines. Curve 20 is the same on all three graphs and represents the times for the picked reflection event 10 shown in FIGS. 1A and 1B. This curve is not a straight line because the event moveout is not hyperbolic. NMO attempts to approximate the reflection times with a straight line 21, as shown in FIG. 2A. Clearly, in this case, this is not a good approximation; the shape of the real reflection event cannot be described with a hyperbolic equation.

A fundamental concept of the present invention is the following: instead of attempting to use a single functional form (such as hyperbolic) to describe the reflection times over the entire offset range, the range is split into sub-ranges. A separate function such as a hyperbola or a higher-order polynomial is used within each of the sub-ranges to approximate the reflection times. Thus, the present invention uses a piecewise curvilinear approximation of the reflection times to get a better fit than would be possible using a single function over the entire offset range. This requires a mechanism to:

Fit curves to reflection times. For the hyperbolic case, this can be done with standard velocity analysis. Velocity analysis based on fourth-order polynomial functions (rather than hyperbolas) is also available in several current processing systems. Velocity analysis based on higher-order polynomial curves or different types of functions can be implemented in a way similar to the hyperbolic or fourth-order cases described herein.

Combine the curvilinear pieces defined for the different offset sub-ranges, enforcing continuity of the composite event at the boundaries between sub-ranges. A procedure for achieving this will be described later. Two implementations of the present invention, hyperbolic and quartic, are described below.

i. Piecewise hyperbolic fit, or piecewise linear in the $t^2$ vs. $X^2$ domain. This approximation is shown in FIG. 2B. Reflection times are approximated by three different hyperbolas, each providing a close approximation over a different offset range. The hyperbolas graph as straight lines (22, 23, and 24) in this rotated t2 vs. $X^2$ plot. Lines 23 and 24 are denoted by their dotted-line extensions.

The offset ranges used for this piecewise hyperbolic representation may differ somewhat for different areas. The following values are reasonable defaults: 2000–2500 meters for the near-offset range upper boundary; approximately 5000 meters for the next boundary; and approximately 6000 meters for a third boundary. On the scale used for the horizontal axis of FIG. 2B, these boundaries located at 4–6.25; are 16, and 36, respectively. In the particular instance of FIG. 2B, better choices would be 11, 18, and 25.

ii. Piecewise quartic fit. The hyperbolic approximation of FIG. 2B is used for the near offsets, because moveout for small offsets will always be closely approximated by a hyperbola. Other offsets ranges are approximated by 4-th order polynomials. For the example shown in FIG. 2C, two offset ranges provide a close fit. The near offsets are approximated by hyperbola 22 (straight line in the $t^2$ vs. $X^2$ domain); the far offsets are approximated by the curve 25 for which the dotted-line extension is shown. This curve is a 4-th order (quartic) polynomial.

Typical offset ranges for the quartic approximation where only two offset ranges are used are 2000–2500 meters for the near-offset range upper boundary and approximately 5000 meters for the far-offset range upper boundary. In FIG. 2C, these boundaries correspond to 4–6.25 and 25, respectively. In this particular instance, 11 is a better choice for the first boundary.

Figure 3:
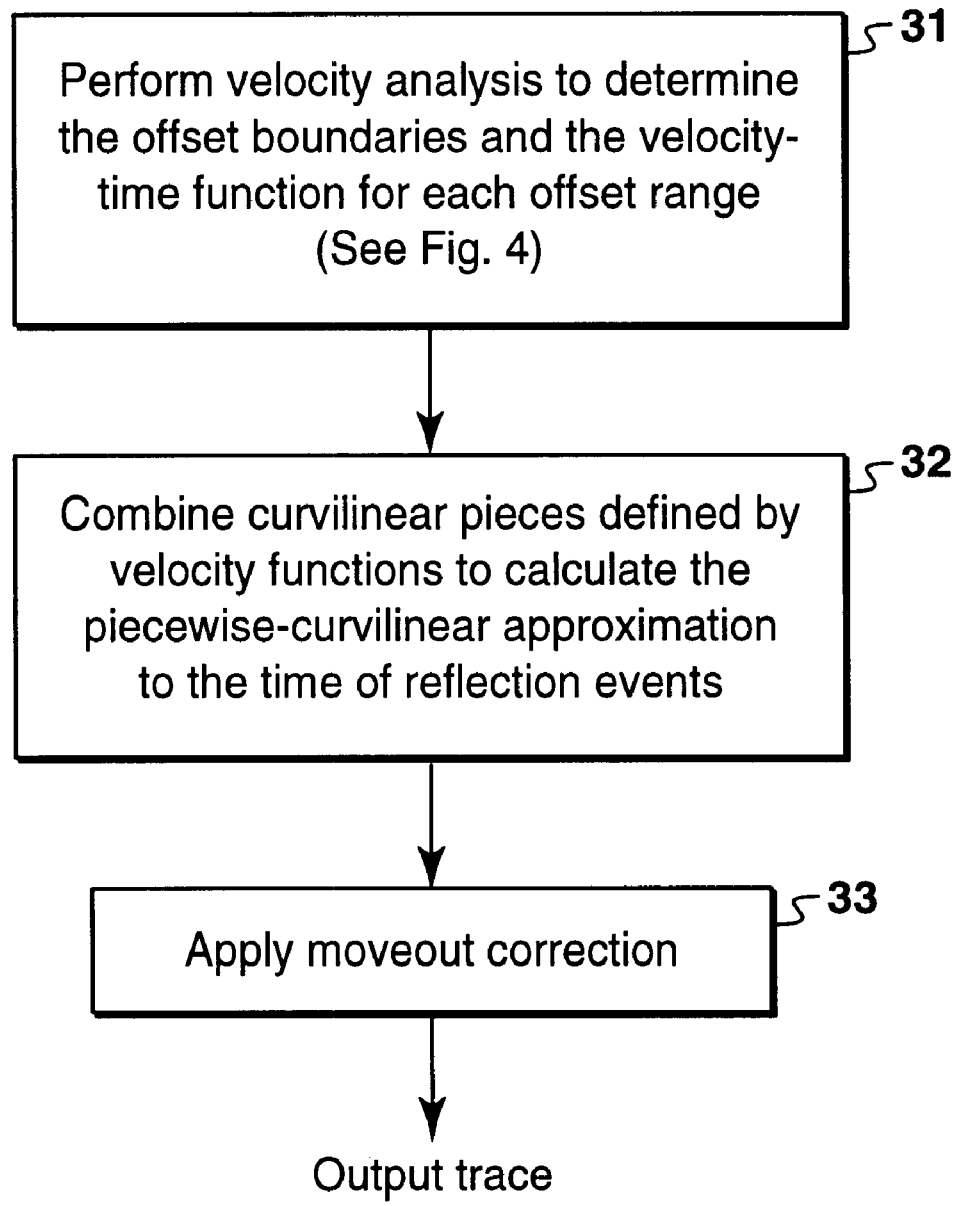
FIG. 3 is a flowchart showing the broad features of some embodiments of the present invention.

A broad overview of the present inventive method is provided in FIG. 3.

At step 31, velocity analysis is performed to determine the boundaries of the offset ranges and the velocity-time function for each offset range. The remaining steps of FIG. 3 will be discussed after the detailed discussion of step 31 which follows.

Figure 4:
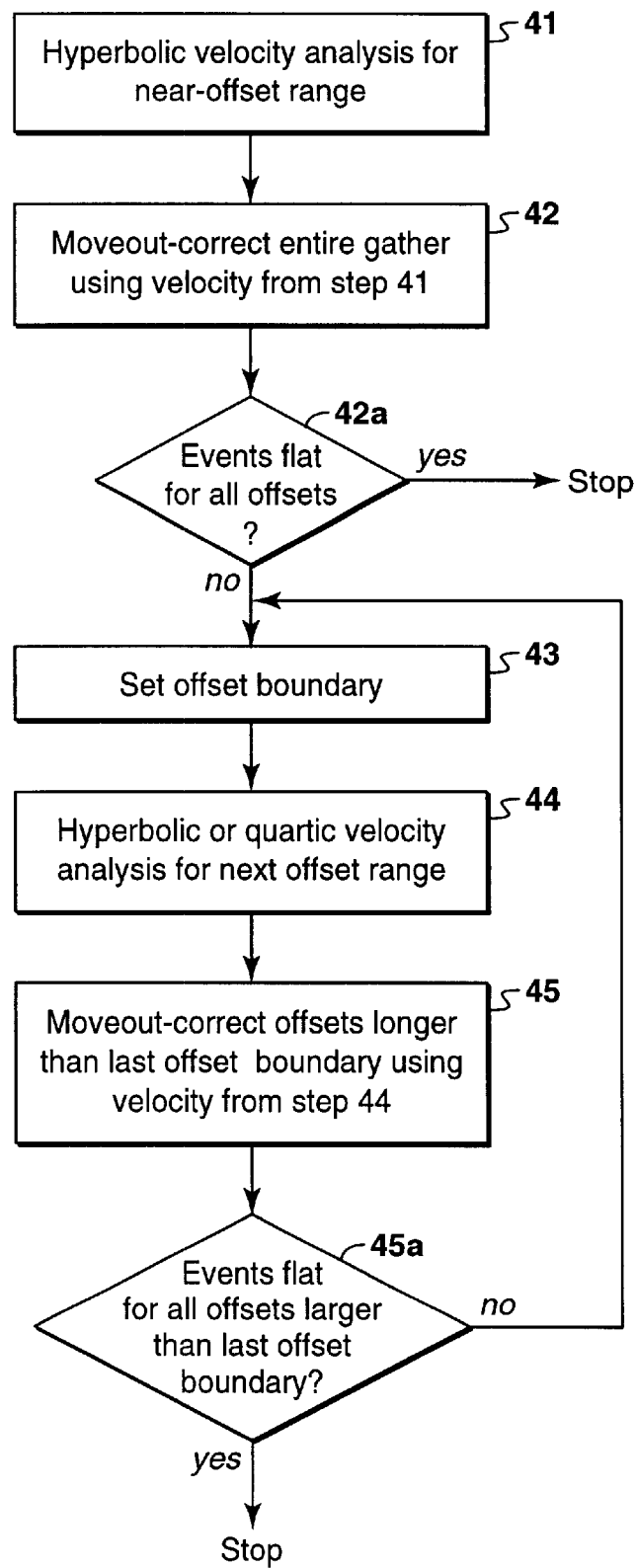
FIG. 4 is a flow chart that expands upon the velocity analysis part (step 31 of FIG. 3) of some embodiments of the invention.

A flowchart outlining the velocity analysis process for some embodiments of the present invention is shown in FIG. 4. After tentative range offset boundaries are chosen, hyperbolic velocity analysis is performed for the near-offset range at step 41. At step 42, the entire gather is moveout-corrected using the velocity function determined from the near offset range, and at step 42a the result is examined. If the reflection events are flat for all offsets, the present invention is not needed, and the process is stopped. If they depart from flatness at longer offsets, however, a hyperbolic velocity function will not be adequate for flattening them over the entire offset range. This determination is part of step 42a. At step 43, the first offset boundary is reset to that offset past which the events tend to deviate from flatness. At step 44, either a second hyperbolic or a quartic velocity analysis is performed for the next offset range. At step 45, events for all offsets larger than the previous offset boundary are moveout-corrected using this second hyperbolic or quartic velocity, and at step 45a it is determined whether this second hyperbolic or quartic velocity is adequate for flattening these events. If so, step 31 (FIG. 3) is finished. Otherwise, a new offset boundary is set and the process is repeated until the reflection events are flat over the entire range of offsets.

Although FIG. 4 illustrates the case where a combination of hyperbolic and quartic curves are used to describe the reflection event moveout, the present invention is not limited to these types of curves. Other functional forms can also be used.

Figure 5A:
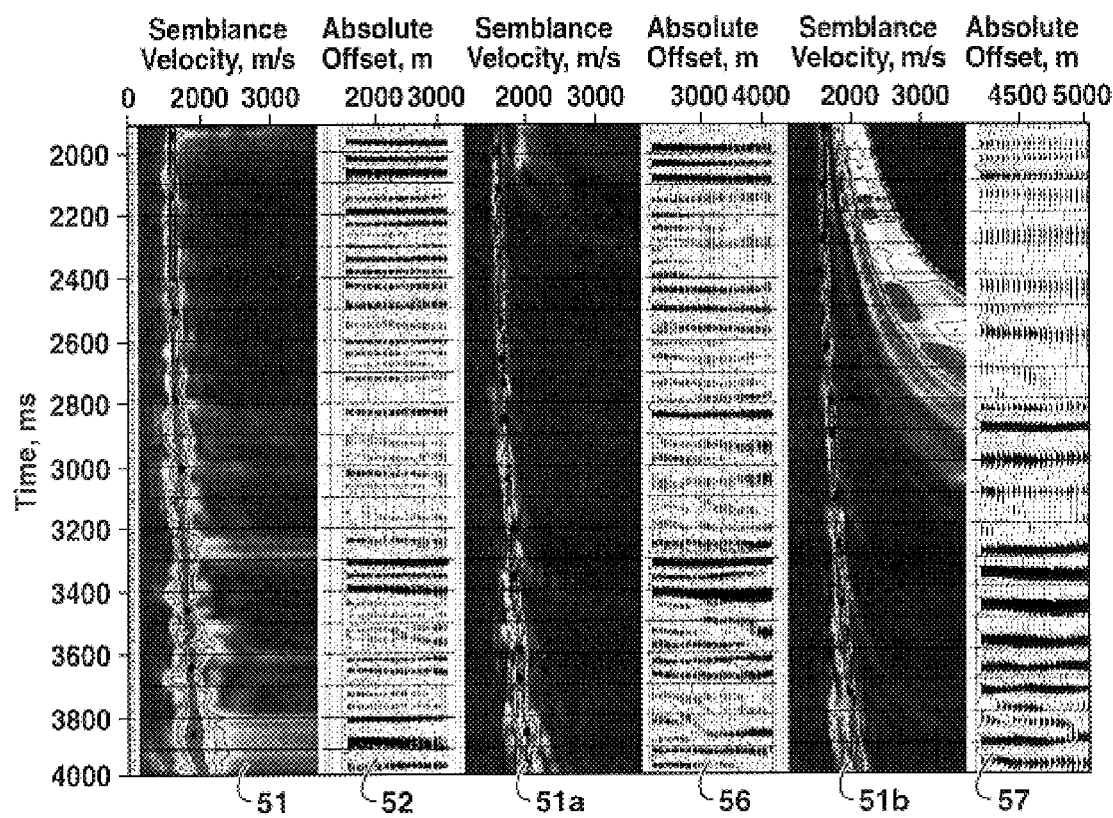
FIGS. 5A and 5B show, respectively, actual semblance plots, and velocity functions picked from them, for three offset ranges, with the flattening of velocity events by such velocity functions also shown for each offset range.
Figure 5B:
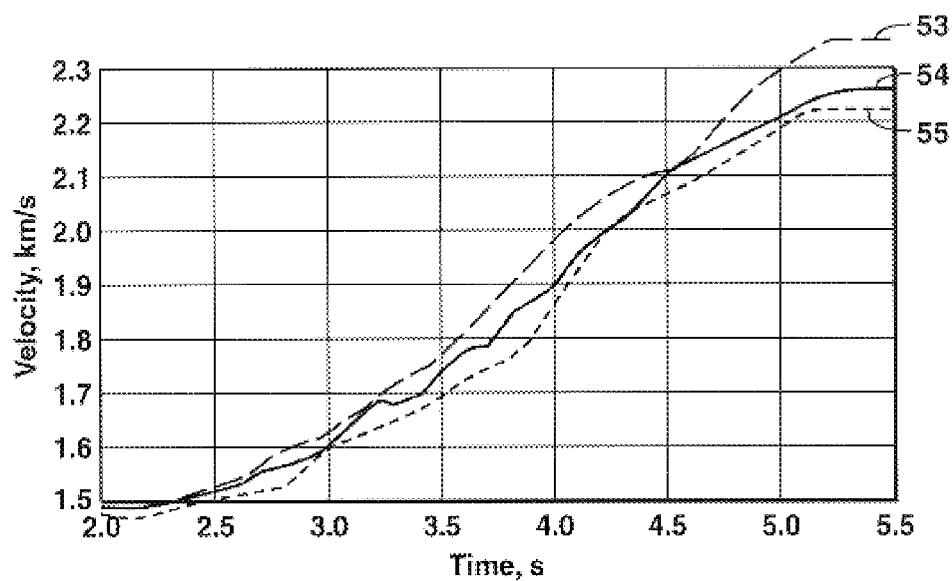

When hyperbolic velocity analysis is used in the present invention, it may be performed by any of the standard methods known to those trained in the art. FIG. 5 shows how this is done in one embodiment of the present invention where hyperbolic analysis is performed over each of three offset ranges using a measure of coherence called semblance. Values of semblance are calculated for each offset range using the equation $$t^2 = t_0^2 + \left(\frac{X}{V}\right)^2$$

to determine $V(t_0)$ that maximizes the semblance. In this equation, t represents reflection time, $t_0$ the reflection time at zero offset, X the offset, and $V=V(t_0)$ is the velocity function for the offset range being considered. The left third of FIG. 5A shows the semblance panel 51 for the offset range 0–2000 m, and next to it (52) the corresponding position of the gather after hyperbolic moveout with the velocity function determined from semblance panel 51. The middle third of FIG. 5A shows the semblance panel 51a for the offset range 2000–4000 m, and at 56 the gather is shown over the same offset range after hyperbolic moveout correction using the velocity function determined from semblance panel 51a. Similarly, the semblance panel for the offset range 4000–5100 m is at 51b, and at 57 the gather is shown over the same offset range after hyperbolic moveout correction using the velocity function determined from semblance panel 51b. It can be seen that the combination of three ranges and hyperbolic velocity analysis is sufficient to flatten the reflection events over the entire offset range. FIG. 5B shows the three velocity functions determined from the semblance panels plotted together for comparison. The velocity function for the offset range 0–2000 m is shown at 55, for 2000–4000 m at 54, and for 4000–5000 m at 53.

FIG. 6 is a flow chart of the quartic velocity analysis process for some embodiments of the present invention. As with hyperbolic velocity analysis, persons trained in the art will know variations of the method shown for quartic analysis, and all such variations are embraced within the present invention. FIG. 6 shows how quartic velocity analysis is applied to the second offset range after the first offset range, i.e., the range for which moveout is hyperbolic, has been determined. Quartic analysis for offsets beyond the second offset range, as necessary, is performed in the same way.

Looking at FIG. 6 in more detail, at step 61, standard hyperbolic velocity analysis is performed on the near-offset range, and the near-offset velocity function $V_1$ is determined. Since hyperbolic velocity analysis will be the first step in the velocity analysis process in most embodiments of the present invention (see FIG. 4), this step will have already been completed.

At step 62, the full gather (the whole range of offsets) is moveout corrected using the velocity fiction $V_1$ picked in step 61. The effect of this step is that an event at time $t_2$ moves to time $t_1$, where $$t_2^2 = t_1^2 + \left(\frac{X}{V_1(t_1)}\right)^2.$$

At step 63, inverse quartic moveout is applied to the full gather using a constant pseudo-velocity $V_c$. An event, a time $t_1$ moves to time t in accordance with the equation $$t_1 = t - \left(\frac{X}{2V_c}\right)^4.$$

The factor $V_c$ has units of $(distance)/(time)^{1/4}$. Hence, it is called a pseudo-velocity since it does not have units of velocity. The exact value of the constant $V_c$ is not important. A typical choice is the average velocity for the region.

At step 64, quartic velocity analysis is performed to determine the necessary velocities flattening the portions of the reflection events for the given offset range. This can be done by calculating semblances based on the equation:

$$t = t_0 + \left(\frac{X}{2V_2}\right)^4$$

and determining the pseudo-velocity function $V_2(t_0)$ that maximizes the semblances. As with hyperbolic analysis, if the quartic fit is not satisfactory for the entire remaining range of offset values, a boundary for the second offset range is set based on where the fit becomes unsatisfactory, and the process is repeated on a third offset range, and so on until a piecewise fit has been achieved.

Having performed the hyperbolic or quartic velocity analyses to complete step 31 of FIG. 3, the events for the different offset ranges can be flattened, as is shown, for example, in FIG. 5A. Yet, events will usually line up at different zero-offset times (read off the vertical axis of FIG. 5A) for the different offset ranges. This can be seen in the example of FIG. 5A: if the three pieces of the gather 52, 56 and 57 corresponding to the different offset ranges are put together, the reflection events (broad, dark, horizontal lines), have discontinuities at the boundaries between the different ranges. This same effect is also shown in FIGS. 2B and 2C, by the dotted lines 23 and 24 extending the hyperbolic pieces or the dotted curve 25 extending the quartic piece to zero offset. The times at which these lines intersect the X=0 axis are the zero-offset times at which the different pieces of the event will be lined up after application of hyperbolic (NMO) or quartic moveout correction.

To solve this problem, the present invention imposes the condition that the reflection times at offset boundaries must be continuous. This uniquely determines all parameters in the reflection time as a function of offset over the full offset range, whether the function is hyperbolic, quartic, or some other. This is part of step 32 of FIG. 3, where the velocity functions from step 31 are used to calculate a continuous function approximating reflection time as a function of offset. Then at step 33, this continuous function is used to moveout–correct the seismic data.

The necessary formulas for the calculation of the reflection times in one preferred embodiment of the present invention are given below for the hyperbolic and quartic cases. Other mathematically equivalent, or approximately equivalent, expressions may be used in other embodiments.

$$t_i^2(X) = t_{0,i}^2 + \left[\frac{X}{V_i(t_{0,i})}\right]^2 \quad \text{Hyperbolic}$$

$$\left.\begin{array}{l} t_i^2(X) = t_{nmo,i}^2(X) + \left[\dfrac{X}{V_i(t_{nmo,i})}\right]^2 \\[6pt] t_{nmo,i}(X) = t_{0,i} + \left[\dfrac{X}{2V_i(t_{0,i})}\right]^4 - \left(\dfrac{X}{2V_c}\right)^4 \end{array}\right\} \quad \text{Quartic}$$

where:

$t_i$=reflection time for the approximating curve used for the i-th offset range, i=1 denoting the near-offset range, etc.;

X=offset within i-th offset range;

$t_{0,i}$=zero-offset time for the i-th approximating curve;

$V_i$=velocity (or pseudo-velocity) function for the i-th offset range ($V_1$ is the hyperbolic velocity function for the near-offset range); and $V_c$=a constant pseudo-velocity, chosen as described above.

The parameter $t_{0,1}$ will still be determined, to use FIG. 5A as an example, from where the reflection event lines 52 intersect the time axis. The other necessary parameters $t_{0,i}$, i=2, 3, . . . , are determined by enforcing the continuity conditions for the events at the boundary offsets, i.e.:

Continuity at $X_1$: $t_1(X_1)=t_2(X_1)$→find $t_{0,2}$
Continuity at $X_2$: $t_2(X_2)=t_3(X_2)$→find $t_{0,3}$ etc.

With the parameters $t_{0,i}$ thus determined, the preceding equations are combined to yield the approximate reflection time as a continuous function of offset throughout all the offset ranges.

Figure 7:
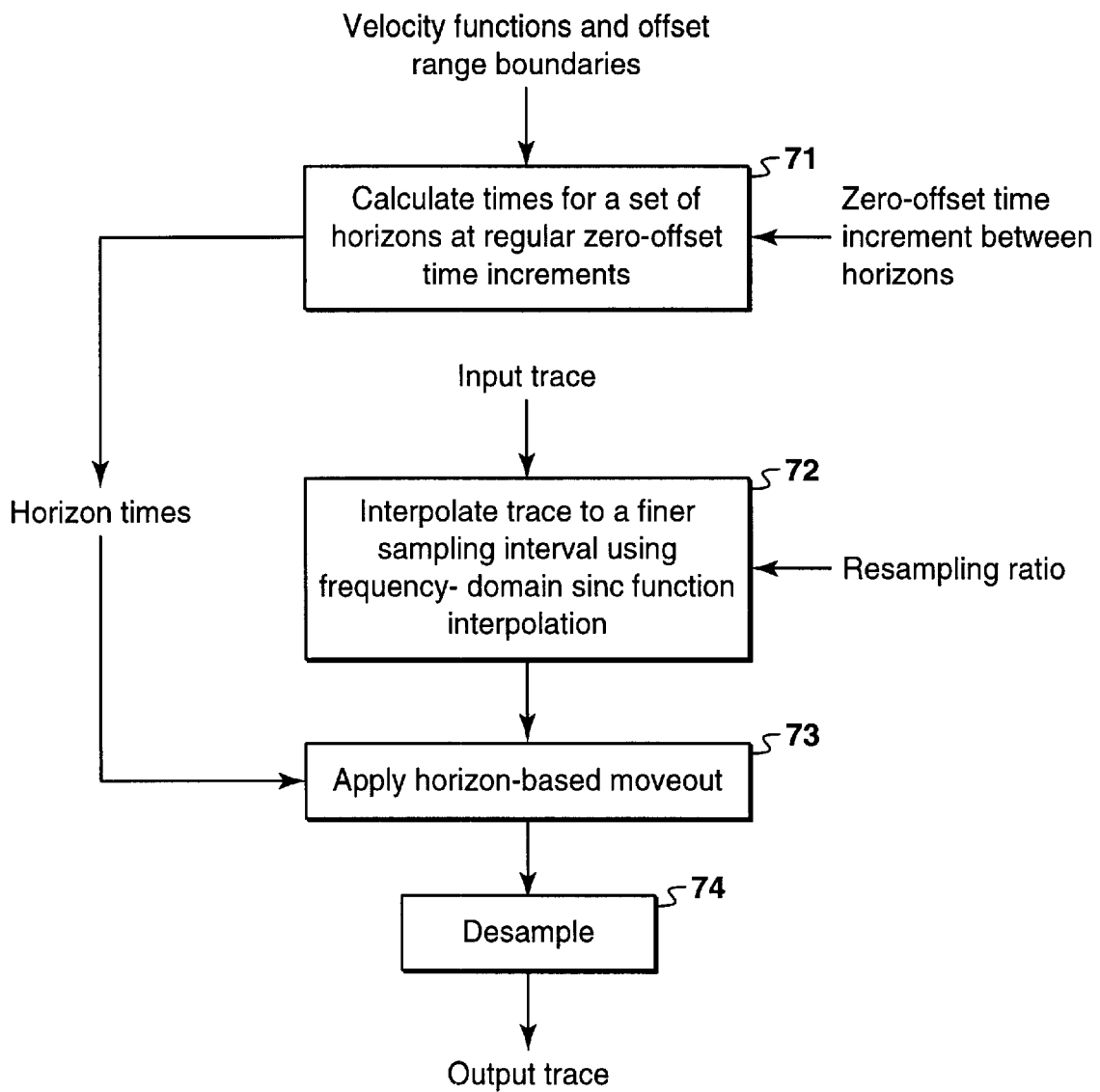
FIG. 7 is a flow chart showing pseudo-horizon moveout techniques and data interpolation techniques used in some embodiments of the present invention.

With the reflection times thus defined for all offsets, applying moveout correction to the seismic data (step 33 of FIG. 3) is a straightforward matter: an event at a time $t_t(X)$ is moved to the corresponding zero-offset time $t_{0,i}$. This can be achieved in the present invention in a variety of ways. A preferred embodiment is shown in the flow chart of FIG. 7.

Figure 8B:
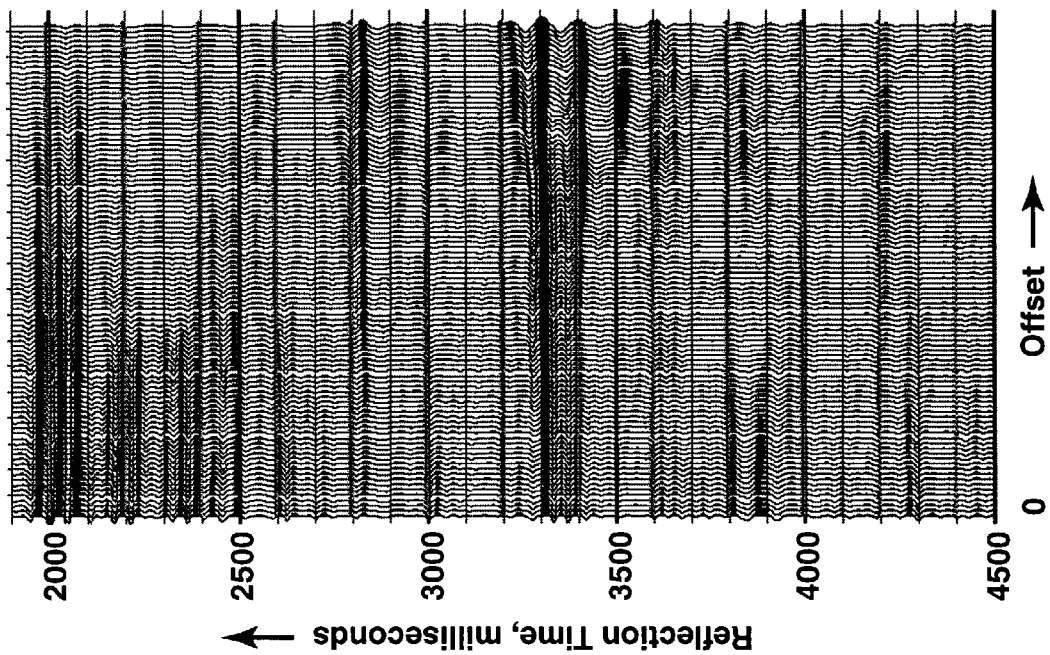
FIGS. 8A and 8B illustrate horizon-based moveout on an actual dataset.
Figure 8A:
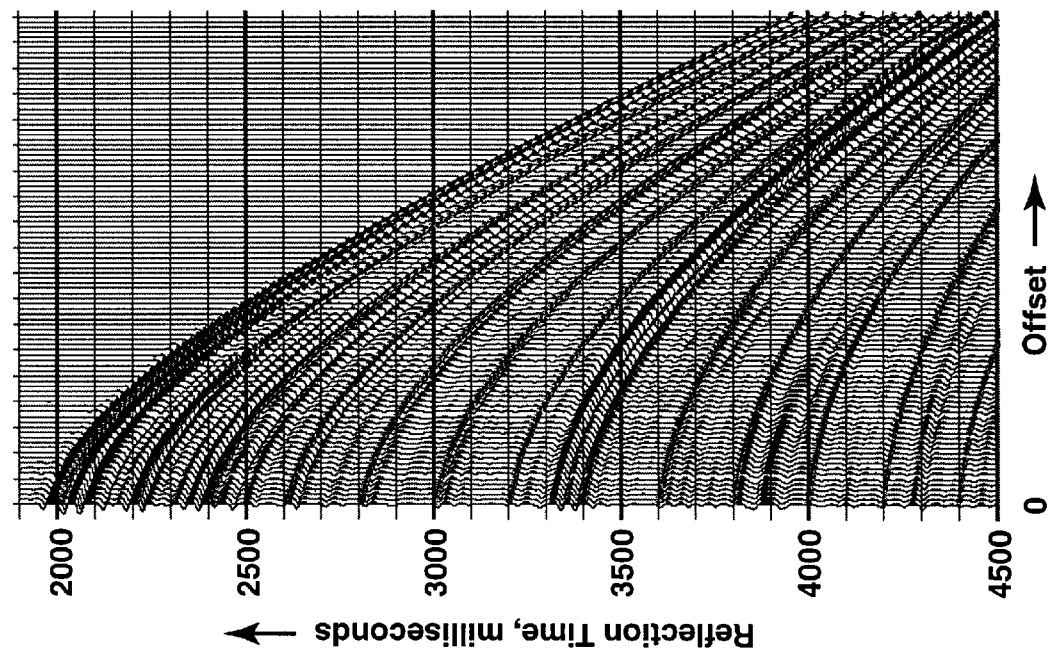

At step 71, the reflection times are calculated for a set of fictitious reflectors called pseudo-horizons, located at predetermined zero-offset time increments. The pseudo-horizons are generated by using the piecewise continuous velocity function determined as outlined immediately above. FIG. 8A shows a set of such pseudo-horizons located at 200 ms increments beginning at $t_0$=2000 ms and superimposed on the CDP gather for which they were determined. This is the same gather shown for the example of FIGS. 5A and 5B, and the pseudo-horizons were determined from the three hyperbolic velocity functions shown there. Therefore, the pseudo-horizons are piecewise hyperbolic. These horizons do not necessarily coincide with real reflection events, since they are constructed at regular zero-offset time increments (200 milliseconds in this display); they are hence called pseudo-horizons. Being constructed from the velocity functions that were fit to the data, they naturally tend to parallel nearby reflection events. For an actual application of the present invention, the pseudo-horizons would normally not be plotted or otherwise shown in an output display. They would be calculated only internally within the computer program automation of the present invention.

Once pseudo-horizons are defined, flattening the reflection events in the gather is simply achieved through a generalization of the normal-moveout approach, which can be called horizon-based moveout. Horizon-based moveout amounts to transforming the gather so that data samples falling on the horizons are shifted up and lined up at the corresponding zero-offset times. Data samples between horizons are shifted up by intermediate amounts. FIG. 8B illustrates the result of applying horizon-based moveout to the gather depicted in FIG. 8A.

The horizon-based moveout process (step 73 in FIG. 7) is performed with the following steps:

For a given output zero-offset time, the corresponding input data time T is found. This is performed by linear interpolation, based on the input horizon times.

The output data value (amplitude) is calculated from the input data samples neighboring time T, using interpolation. For example, a four-point polynomial interpolation may be used here.

In another embodiment of the present invention, prior to the application of horizon-based moveout at step 73, the input trace is interpolated at step 72 to a finer sampling interval using high-precision interpolation, such as frequency-domain sinc-function interpolation. This is done to improve the performance of the interpolation between data samples in the second sub-step immediately above. This is particularly important for the interpolation of high frequencies in 4-ms data. After application of horizon-based moveout, the trace may be desampled at step 74 to its original sampling rate.

Besides the use of pseudo-horizons and various interpolation methods known to persons skilled in the art, the present invention includes embodiments such as those in which the moveout correction is calculated directly from the piecewise-continuous velocity function that the present invention generates; however, the use of such approximating techniques as pseudo-horizons and interpolation are usually preferable in non-hyperbolic situations because of the need for great savings in computing time as contrasted with NMO where direct calculations using a single hyperbola equation can be made quickly. Persons trained in the art will also recognize that the present inventive method can be readily automated in computer programs.

Figure 9C:
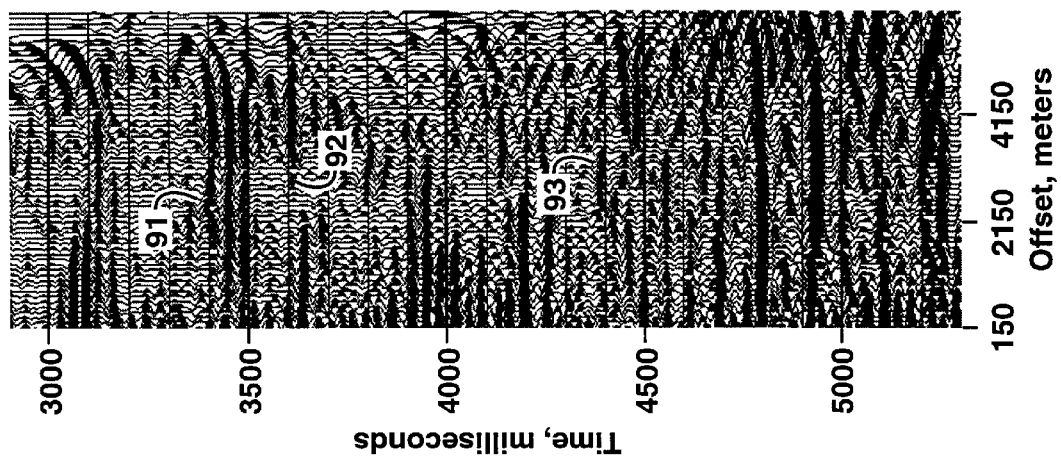
FIGS. 9A, 9B, and 9C compare a 2-pass hyperbolic application (FIG. 9B) to a 2-pass quartic application (FIG. 9C) for one embodiment for the present invention, with NMO also shown (FIG. 9A)
Figure 9B:
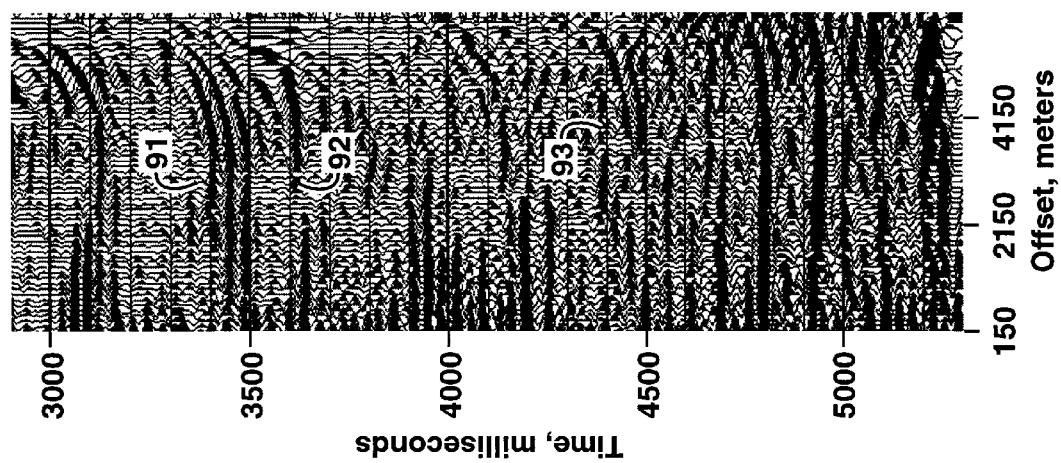
Figure 9A:
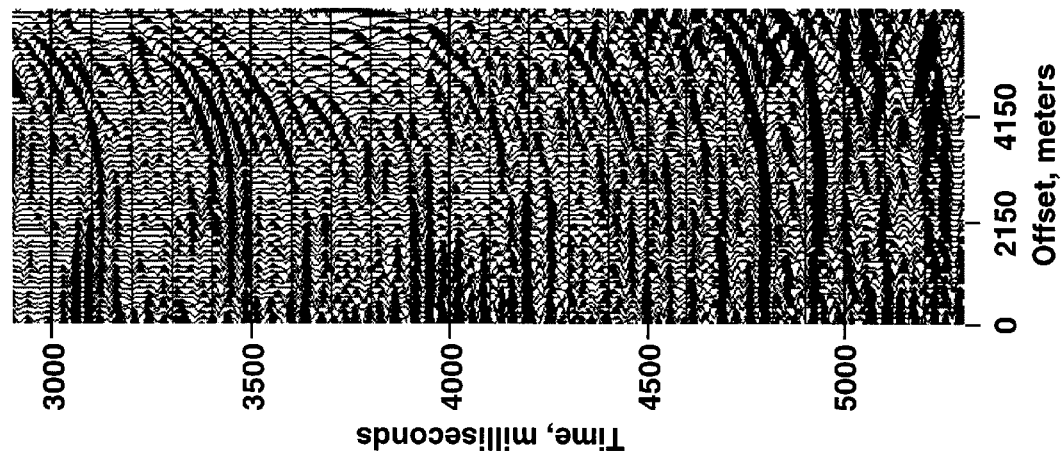

In general, the quartic option may allow the flattening of the events over a larger range of offsets for the same number of velocity analysis passes. This is illustrated in FIGS. 9A–9C. FIG. 9A shows certain data after normal moveout correction. FIGS. 9B and 9C show the same data after moveout correction by the present invention. In FIG. 9B, two offset ranges are used, with hyperbolic velocity analysis used in each ("2-pass hyperbolic"). In FIG. 9C, 2-pass quartic correction is used. It is significant that the three events 91, 92, and 93 are better flattened using the quartic option. Use of the quartic option may often lead to considerable time savings by reducing the number of velocity analysis passes (i.e., the number of offset ranges) that will need to be performed. In many instances, the 2-pass quartic option may be almost equivalent to the 3-pass hyperbolic option.

On the other hand, since the physical meaning of hyperbolic moveout velocities is better understood, hyperbolic velocity analysis provides some feedback to the processor about the correctness of the velocity picks. For example, FIG. 5B shows how the shapes of the three velocity functions are similar, yet they become progressively faster for longer offsets. If the functions appear to cross or are very dissimilar, the processor should be alerted to re-examine the velocity picks.

Figure 10B:
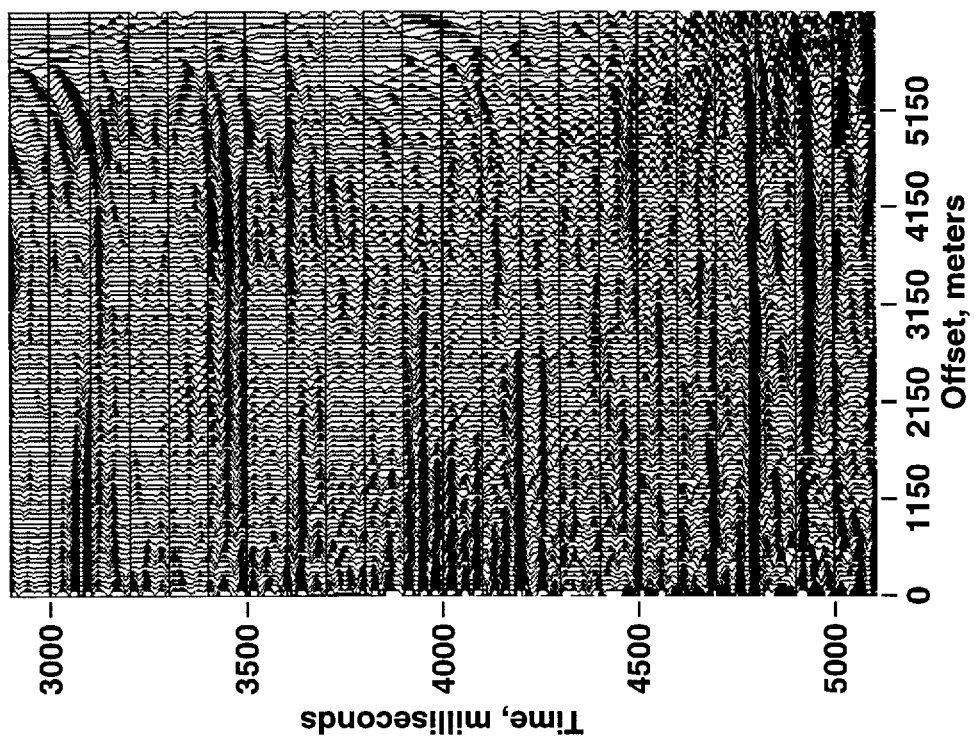
FIG. 10B illustrates a 2-pass quartic application of one embodiment of the present invention, compared to NMO as shown in FIG. 10A.
Figure 10A:
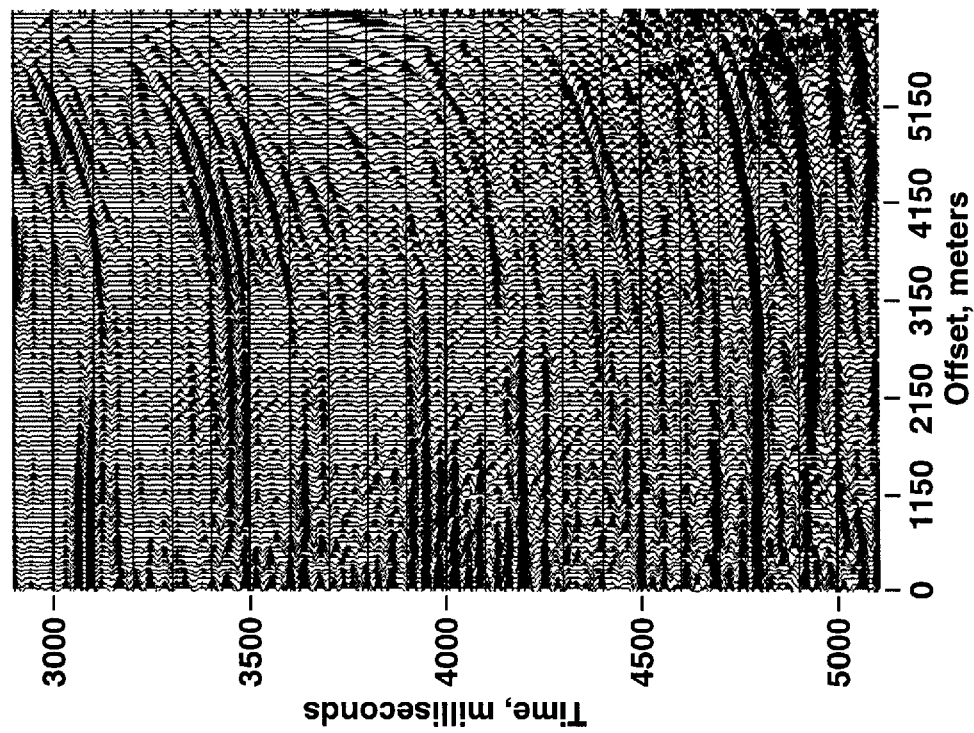
Figure 11B:
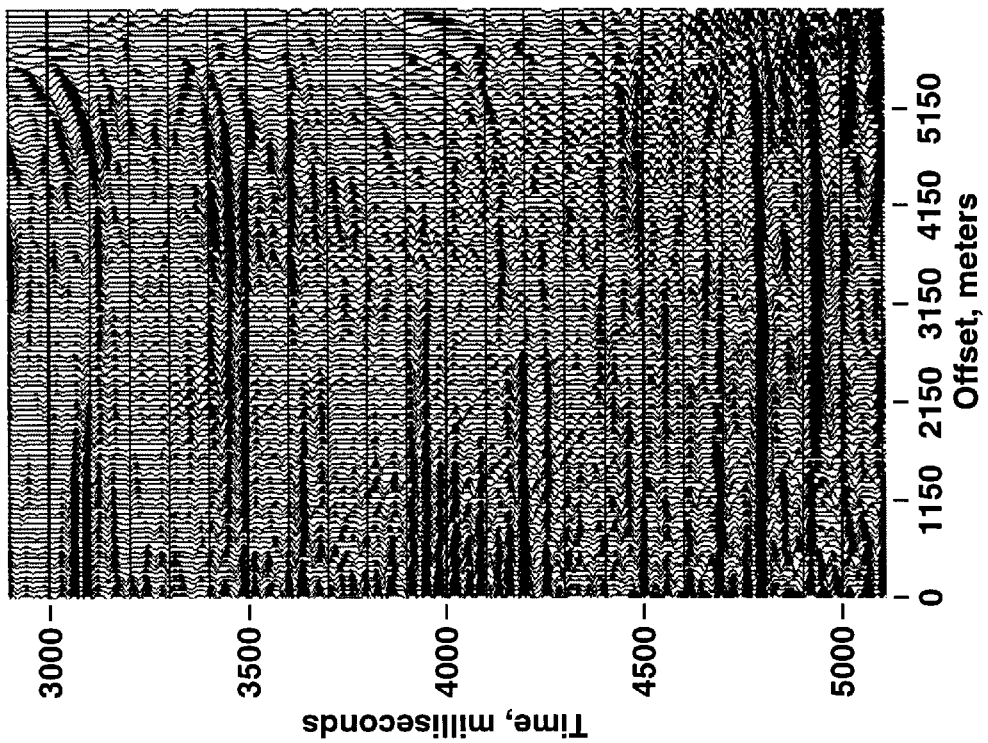
FIG. 11B illustrates a 3-pass quartic application of one embodiment of the present invention, compared to NMO as shown in FIG. 11A.
Figure 11A:
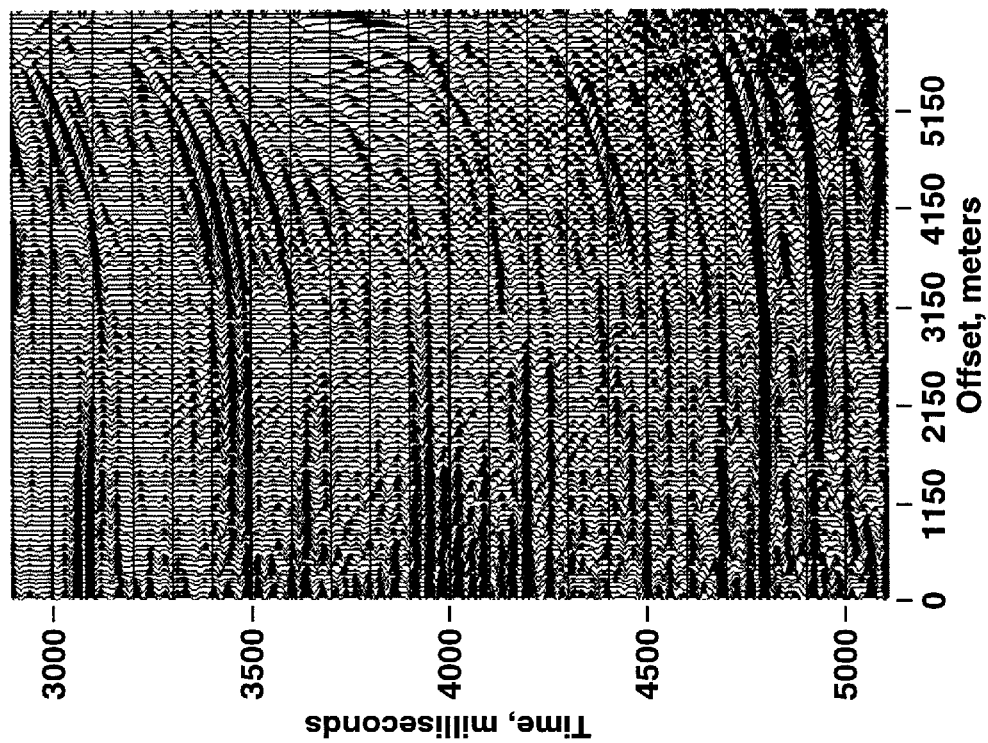

FIGS. 5A and 8B illustrate examples that demonstrate the effectiveness of the present invention using the hyperbolic option. FIG. 9B enables the 2-pass hyperbolic option to be compared to the 2-pass quartic option in FIG. 9C. FIGS. 10A and 10B and FIGS. 11A and 11B demonstrate the application of 2-pass and 3-pass quartic velocity analysis, respectively, to the same dataset. FIGS. 10A and 11 A are identical and show the data after NMO. FIG. 10B shows the improved flatness achieved by use of the 2-pass quartic option of the present invention, and FIG. 11B shows the result of using the 3-pass quartic option. It can be seen that 2-pass quartic is very nearly as good as 3-pass quartic in this example.

The foregoing description is directed to particular embodiments of the present invention for purposes of illustrating it. It will be apparent, however, to one skilled in the art that many modifications and variations to the embodiments described herein are possible. For example, although use of the invention may be primarily for AVO applications, these are not the only potential uses. Others include (1) residual post-migration event alignment to achieve better stacks; (2) converted-wave processing; and (3) alignment of noise before filtering. All such modifications and variations are intended to be within the scope of the present invention as defined in the appended claims.

What is claimed is:

1. A method for correcting a CDP gather of seismic data collected from a subterranean region for non-hyperbolic moveout effects, said data including seismic amplitudes and reflection times for different offsets, said method comprising the steps of:
   (a) dividing said offsets into a plurality of ranges, each offset range having an upper boundary and a lower boundary, the upper boundary for one offset range coinciding with the lower boundary for the next offset range;
   (b) determining for each said range an analytical function approximately fitting the reflection time vs. offset values of said data within said range, said function having constant parameters and coefficients;
   (c) combining said analytical functions, enforcing continuity at range boundaries; and
   (d) applying moveout correction to seismic data using said combined analytical function.

2. The method of claim 1, wherein said analytical function is determined by velocity analysis.

3. The method of claim 1, further comprising the following additional step:
   (e) using the moveout-corrected data from step (d) for AVO analysis.

4. The method of claim 1, wherein said constant parameters for each range include the reflection time for zero offset ($t_0$) for said range, and wherein said step of enforcing continuity at range boundaries fixes $t_0$ for each said range in terms of $t_0$ for said range having smallest offset values.

5. The method of claim 1, wherein said moveout correction comprises the steps of:
   (a) correcting the reflection times by interpolating a set of pseudo-horizons created at preselected zero-offset time increments; and
   (b) correcting the data amplitudes to tile amplitudes obtained by interpolating data amplitudes before moveout correction in the neighborhood of the reflection times obtained from interpolating between pseudo-horizons.

6. The method of claim 2, wherein said analytical function is a polynomial.

7. The method of claim 2, wherein said velocity analysis for the range of offsets having smallest offset values ("near-offset" range) is hyperbolic and the upper boundary for the near-offset range is reset to that offset above which reflection events begin to deviate from flatness after moveout correction of the entire gather using the velocity function determined for the near-offset range.

8. The method of claim 5, further comprising the steps of:
   (a) interpolating said data before said moveout correction, said interpolation being high-precision interpolation resulting in a finer sampling interval; and
   (b) desampling after said moveout correction to remove excess output data.

9. The method of claim 6, wherein said polynomial is an hyperbolic function.

10. The method of claim 6, wherein said polynomial is a quartic function.

11. The method of claim 8, wherein said high-precision interpolation is frequency-domain sinc-function interpolation and said amplitude interpolation is a four-point polynomial interpolation.

12. The method of claim 9, wherein the said parameters and coefficients of said hyperbolic function are chosen by selecting a measure of coherence, and finding values of said parameters that produce maxima in said measure of coherence.

13. The method of claim 10, wherein said quartic velocity analysis comprises the following steps:
   (a) performing hyperbolic velocity analysis on said offset range containing the smallest offsets ("near offset" range), thereby determining the near offset velocity function $V_1(t_0)$, where $t_0$ is the reflection time for zero offset;
   (b) moveout correcting said full gather using said velocity function $V_1$;
   (c) applying inverse quartic moveout to said full gather using a constant pseudo-velocity $V_c$;
   (d) selecting a measure of coherence; and
   (e) determining for each offset range i=2, 3, . . . the pseudo-velocity function $V_i(t_0)$ that maximizes said measure of coherence for said range.

14. The method of claim 12, wherein said measure of coherence is semblance, and said hyperbolic velocity analysis for each said offset range comprises the following steps:
   (a) calculating semblances for said offset range based on the equation $$t^2 = t_0^2 + \left(\frac{X}{V(t_0)}\right)^2$$

where t is the reflection time at offset X,
   $t_0$ is the zero-offset reflection time, and
   $V(t_0)$ is the Normal-Moveout velocity, a function of time; and
   (b) determining $V(t_0)$ that maximizes said semblance for said range.

15. The method of claim 13, wherein said measure of coherence is quartic semblances.

16. The method of claim 15, wherein said $V_c$ has a value equal to the average velocity for said subterranean region, but with units of $(distance)/(time)^{1/4}$.

17. The method of claim 15, wherein each said range is numbered with index i, and wherein:
   (a) said moveout correction moves a reflection event occurring at time $t_2$ to time $t_1$ according to the equation $$t_2^2 = t_1^2 + \left(\frac{X}{V_1(t_1)}\right)^2;$$

(b) said inverse quartic moveout moves a reflection event at time $t_1$ to time t where $$t_1 = t - \left(\frac{X}{2V_c}\right)^4;$$

and
   (c) said semblances for said i-th range are calculated based on $$t = t_0 + \left(\frac{X}{2V_i(t_0)}\right)^4;$$

where t is reflection time;
   X is offset; and
   $t_0$ is the zero-offset reflection time for said ith range.

18. A method for correcting a CDP gather Df seismic data collected from a subterranean region for non-hyperbolic moveout effects, said data including seismic amplitudes and reflection times for different offsets, said method comprising the steps of:

(a) dividing said offsets into a plurality of ranges, each offset range having an upper boundary and a lower boundary, the upper boundary for one offset range coinciding with the lower boundary for the next offset range;

(b) performing hyperbolic velocity analysis to determine velocity as a function of time for said offset range having smallest offset values ("near-offset" range);

(c) moveout-correcting said entire gather using said velocity function determined from said near offset range; and (d) resetting said upper boundary for said near-offset range to that offset above which reflection events in said moveout-connected entire gather begin to deviate from flatness;

(e) electing the range of second smallest offset values, resetting its upper boundary if desirable;

(f) performing velocity analysis to determine velocity as a function of time for said selected offset range;

(g) moveout correcting reflection events in said selected range and above, using said velocity function determined in step (i);

(h) resetting said upper boundary for said selected range to that offset above which the moveout-corrected reflection events from step (g) tend to deviate from flatness;

(i) selecting the range of offsets with next larger offset values, adjusting its upper boundary as necessary, and repeating steps (f)—(i) until the reflection events are approximately flat for all offsets;

(j) combining the velocity functions determined for each offset range, enforcing continuity at range boundaries; and (k) applying moveout correction to said seismic data using the combined velocity function.

19. The method of claim 18, wherein said velocity analysis for all offset ranges is hyperbolic.

20. The method of claim 18, wherein said velocity analysis for all offset ranges except said near offset range is quartic.

* * * * *

UNITED STATES PATENT AND TRADEMARK OFFICE
CERTIFICATE OF CORRECTION

PATENT NO.     : 6,502,038 B1                                     Page 1 of 1
DATED          : December 31, 2002
INVENTOR(S)    : Spyridon K. Lazaratos and Pravin M. Shah It is certified that error appears in the above-identified patent and that said Letters Patent is hereby corrected as shown below:

Column 12,
Line 63, please delete "Df" and insert -- of -- therefore.

Signed and Sealed this

Thirteenth Day of May, 2003

JAMES E. ROGAN
*Director of the United States Patent and Trademark Office*